United States Patent [19]
Mueller et al.

[11] Patent Number: 5,652,486
[45] Date of Patent: Jul. 29, 1997

[54] TRAVEL SPEED LIMITING SYSTEM FOR FORKLIFT TRUCKS

[75] Inventors: Steven J. Mueller; Richard O. Haupt; Donald G. Haupt, all of Manitowoc; Lowell A. Kempfert, Neenah, all of Wis.

[73] Assignee: S.L.O.W. Corporation, Manitowoc, Wis.

[21] Appl. No.: 422,695

[22] Filed: Apr. 14, 1995

[51] Int. Cl.$^6$ ........................................ H02P 3/00
[52] U.S. Cl. .................. 318/369; 318/461; 388/903; 180/171
[58] Field of Search .................. 318/362, 369, 318/452, 453, 461, 463, 139, 63, 261, 264, 273, 275, 439; 180/170, 171, 174, 178, 179; 361/23; 388/903, 930

[56] References Cited

U.S. PATENT DOCUMENTS

| | | | |
|---|---|---|---|
| 3,636,545 | 1/1972 | Boyd et al. | 340/263 |
| 3,911,342 | 10/1975 | Herwig | 318/373 |
| 4,044,551 | 8/1977 | Nelson et al. | 60/39.14 |
| 4,132,934 | 1/1979 | Morton et al. | 318/382 |
| 4,142,135 | 2/1979 | Fujita | 318/139 |
| 4,265,337 | 5/1981 | Dammeyer | 187/9 |
| 4,336,778 | 6/1982 | Howard | 123/334 |
| 4,555,651 | 11/1985 | Melocik et al. | 318/341 |
| 4,862,849 | 9/1989 | Wilson | 123/333 X |
| 4,942,529 | 7/1990 | Avitan et al. | 364/424.01 |
| 5,038,743 | 8/1991 | Remmers | 123/602 |
| 5,113,344 | 5/1992 | Kellogg et al. | 364/424.04 |

OTHER PUBLICATIONS

"Davis DriveRight Price List", Davis Instruments, Jan., 1995.

*Primary Examiner*—Jonathan Wysocki
*Attorney, Agent, or Firm*—Andrus, Sceales, Starke & Sawall

[57] ABSTRACT

A speed limiting system for a vehicle such as a forklift truck enables the travel speed of the vehicle to be limited without limiting maximum throttle position or adjusting a governor to limit maximum engine or motor power. The system can be used with combustion engine vehicles or electric vehicles. The system has a rate of travel sensor, preferably a rotation sensor sensing a rotation rate of the vehicle axle or wheel. A rate of travel signal is provided to either an analog or digital speed limiting control system which outputs a logic high speed control signal when the rate of travel signal exceeds a pre-set overspeed limit value for a selected time period. The speed control signal can be used to display or record occurrences of overspeed vehicle travel, or limit engine or motor power in that presence of the speed control signal. A warning system can also be incorporated to warn of high speed travel which is potentially approaching an overspeed condition.

23 Claims, 4 Drawing Sheets

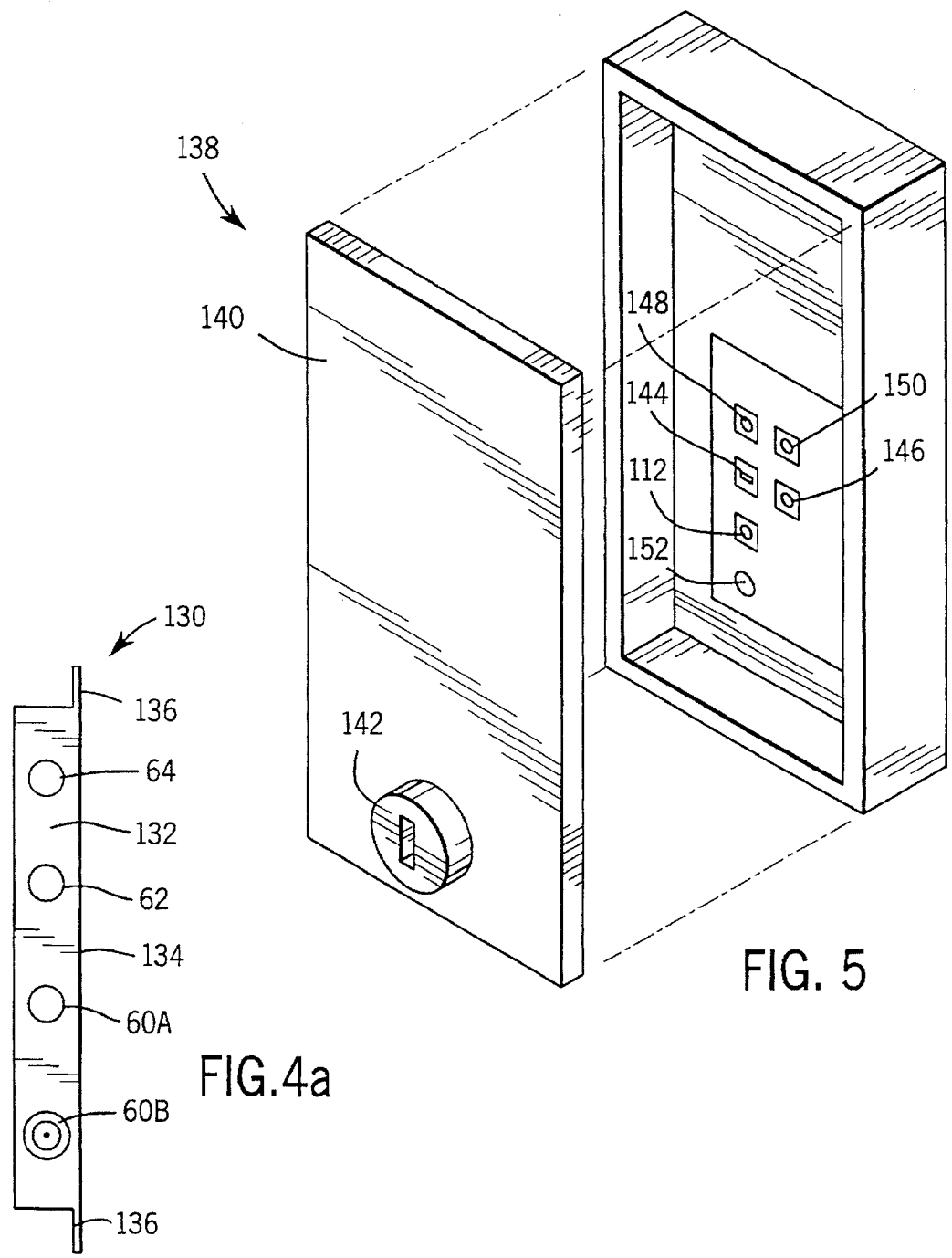
FIG. 5
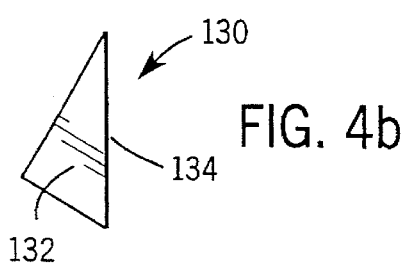
FIG. 4a
FIG. 4b

TRAVEL SPEED LIMITING SYSTEM FOR FORKLIFT TRUCKS

FIELD OF THE INVENTION

The invention relates to a vehicle speed limiting system. In particular, the invention provides an automatic speed limiting system for vehicles travelling above a selected maximum travel speed. The invention is particularly useful for forklift trucks.

BACKGROUND OF THE INVENTION

Forklift trucks and other material handling vehicles are designed to operate in congested areas, and these areas typically include limited visibility and pedestrian traffic. It may therefore be desirable to limit the travel speed of forklift trucks in many situations.

In a forklift truck powered by an internal combustion engine, the engine provides power to propel a passenger compartment and also provides power to a forklift carriage for lifting material on the forks. Likewise, electric forklift trucks typically have a common motor for propelling the passenger compartment and for operating the forklift carriage. Prior efforts to control travel speeds of forklift trucks (particularly on forklift trucks powered by internal combustion engines) have generally limited the maximum throttle position or adjusted an engine governor to control maximum engine revolutions per minute. Both of these methods are not particularly desirable because they limit the available power from the engine (or motor) under all circumstances, including limiting the amount of power available for lifting. These methods also provide inconsistent control of travel speed.

SUMMARY OF THE INVENTION

The invention provides a reliable means of regulating the maximum travel speed of a vehicle, such as a forklift truck, without restricting engine or motor power when the vehicle is traveling at less than a desired maximum speed.

In one aspect, the invention is a forklift truck powered by a combustion engine or an electric motor in which a speed limiter inputs a rate of travel signal and outputs a speed control signal when the rate of travel signal exceeds an overspeed limit value for a selected time period. The speed control signal can be transmitted to a recorder or a remote display that can be reviewed by a supervisor, or can be used to automatically limit power from the forklift engine or motor. In some circumstances, the invention might even be used to completely shutdown the forklift engine or motor when the travel speed of the truck exceeds an overspeed limit value for a selected period of time. However, the invention does not limit the amount of power to the forklift carriage when the travel speed of the truck does not exceed the overspeed limit value for the selected time period.

The forklift truck can also include a warning indicator light and/or buzzer that receives power from the speed limiter when the rate of travel signal exceeds a warning limit value, preferably 90% of the overspeed limit value.

The rate of travel signal is generated by a speed sensor that can be any type of sensor which directly or indirectly measures the travel speed of the forklift truck. The preferred speed sensor is a rotation sensor that generates a rate of rotation signal proportional to a rotation rate of at least one of the wheels on which the forklift passenger compartment is suspended. The preferred rotation sensor includes one or more trigger magnets mounted to one of the rotating components in the forklift drive train such as an axle, and a sensor pick-up for sensing the frequency of rotational movement of the one or more trigger magnets. It is preferred that the signal from the rotation sensor be filtered to exclude extraneous noise before the signal is input to the speed limiter.

In another aspect, the invention is a speed limiting system for any type of vehicle, including a forklift truck. The system has a rate of travel sensor which is preferably a rotation sensor, a speed limiting controller, and a speed control relay. The speed limiting controller can be analog or digital. The controller has an overspeed comparator that inputs the rate of travel signal and outputs an overspeed signal when the rate of travel signal exceeds the overspeed limit value, and a time delay element that inputs the overspeed signal and outputs a speed control signal if the overspeed signal continues to input the time delay element for a selected time period. The speed control relay receives the speed control signal and controls vehicle power or other devices in response to the speed control signal.

Preferably, the speed limiting controller has a warning comparator that inputs the rate of travel signal and outputs a warning signal to one or more warning indicators when the rate of travel signal exceeds a warning limit value. The speed limiting controller can also include a feedback element that inputs the speed control signal and outputs a swamping signal that causes the speed limiting system to generate a speed control signal until the system is reset. The system may be reset manually or automatically.

It can therefore be appreciated that the invention restricts traveling speed without arbitrarily restricting engine (or motor) power, and thereby maintains full power under normal operation conditions for lifting, climbing ramps, and other functions which may require full power.

The invention also allows the owner or supervisor of a forklift, or other vehicle, to determine and enforce a maximum travelling speed for the vehicle within the particular operating environment. The overspeed limit value in the speed limiting controller can be adjusted to meet changing needs. Adjustments as well as system resets can be key operated, thus requiring supervision by someone with a key.

BRIEF DESCRIPTION OF THE DRAWINGS

In the drawings:

FIG. 4A is a schematic drawing of an operator display in accordance with the invention;

FIG. 4B is a top view of a mounting configuration for the operator display in FIG. 2A;

FIG. 5 is an exploded perspective view of a control box containing a speed limiting controller in accordance with the invention;

DESCRIPTION OF THE PREFERRED EMBODIMENT

Figure 1:
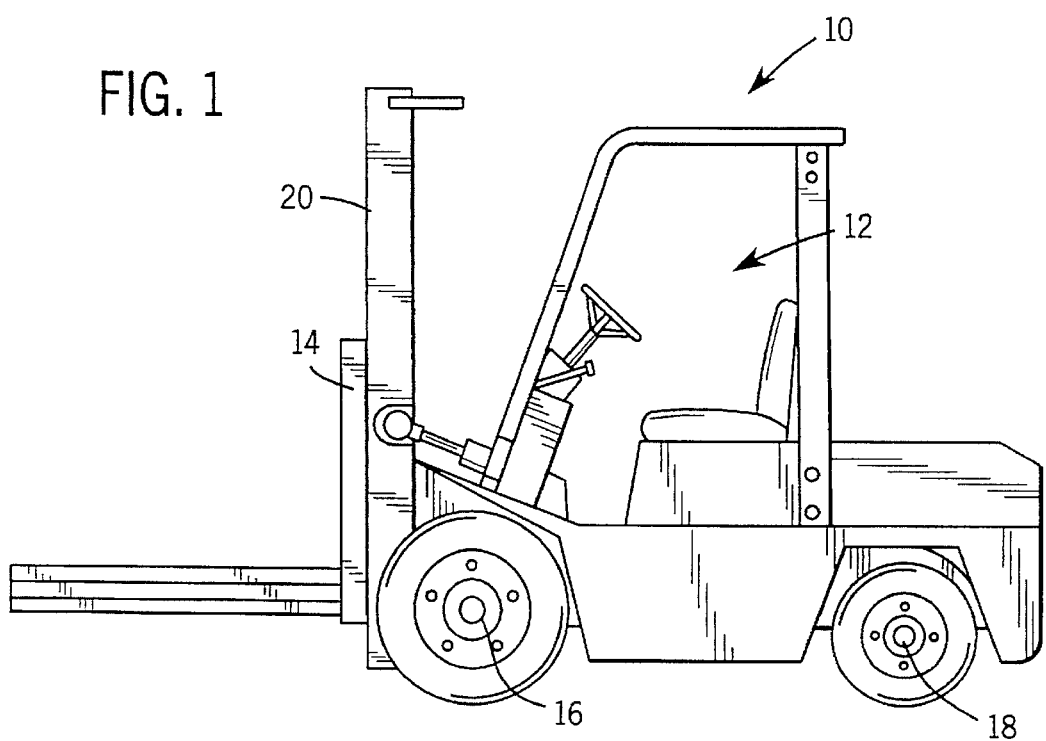
FIG. 1 is a forklift truck in accordance with the invention.

A forklift truck 10 having a passenger compartment 12 and a forklift carriage 14 is shown in FIG. 1. The passenger compartment 12 is suspended on a front axle supported by a front pair of wheels 16 and a rear axle supported by a rear pair of wheels 18. The forklift truck can be propelled by either a combustion engine or an electric motor.

The forklift carriage 14 can be lifted or lowered along a carriage mast 20. In addition, the mast 20 can typically tilt, thus tilting the forklift carriage 14. Typically, power for lifting or lowering the forklift carriage 14 and tilting the mast 20 is provided by the same source of power used to propel the passenger compartment 12, namely a combustion engine or an electric motor.

Figure 2:
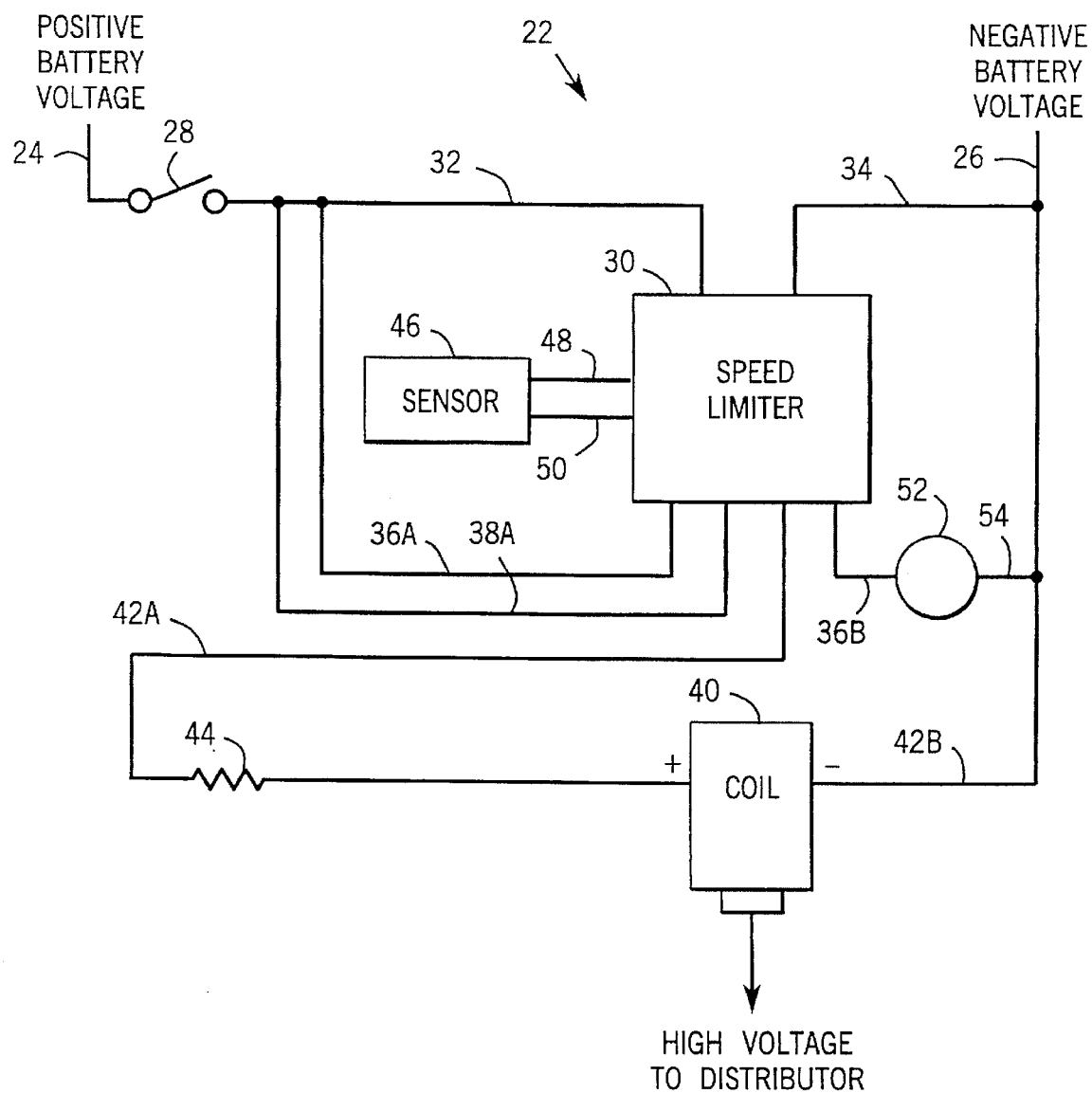
FIG. 2 is a block diagram showing preferred electrical connections in accordance with the invention.

FIG. 2 shows a speed limiting system for limiting the travel speed of a vehicle, preferably a vehicle such as forklift truck 10 shown in FIG. 1. The speed limiting system 22 shown in FIG. 2 can limit the travel speed of a vehicle without reducing power from a vehicle's engine or motor when the vehicle rate of travel does not exceed an overspeed limit value for a preselected time period.

In FIG. 2, positive voltage from a battery is supplied in line 24, and negative battery voltage is supplied to line 26. An ignition switch for the vehicle is shown schematically as switch 28. When the ignition switch 28 is closed, electrical power from the vehicle battery is supplied to a speed limiter 30 through lines 32 and 34. The electrical power supplied to the speed limiter 30 through lines 32 and 34 is used to operate the speed limiting system, including the components located in schematic block 30 and other related devices such as indicators or controls. The speed limiting system has a regulated power supply that preferably supplies high-quality, direct current power at 7.5 volts (i.e. 7.5 volts DC).

When the ignition switch 28 is closed, positive electrical voltage from the vehicle battery also inputs the speed limiter 30 through lines 36A and 38A. Under normal operating conditions, the speed limiter 30 transmits the positive battery voltage in line 38A to coil 40 through line 42A, and negative battery voltage from line 26 is transmitted to the negative side of coil 40 through line 42B. A resistor 44 is located in line 42A through which positive battery voltage is transmitted to the positive side of the coil 40. As depicted in FIG. 2, the coil 40 is an ignition coil for a combustion engine that transmits a high voltage to a distributor which causes engine spark plugs to fire and the combustion engine to provide power.

A speed sensor 46 senses the travel speed of the vehicle and transmits a rate of travel signal through line 48 to the speed limiter 30. The preferred speed sensor 46 is a rotation sensor that generates a rate of travel signal proportional directly or indirectly to the rotation rate of one of the components in the forklift drive train. The speed limiter 30 provides power to the sensor 46 through line 50 and the sensor generates a frequency signal in line 48 that is transmitted to the speed limiter 30.

In accordance with the invention, the speed limiter 30 can disconnect the connection between lines 38A and 42A (e.g. a contactor) when the rate of travel signal in line 48 exceeds a selected overspeed limit value for a preselected time period, thus interrupting power to the positive side of the ignition coil 40. When the power to the coil 40 is interrupted, the engine spark plugs will not fire and the combustion engine will no longer provide power.

FIG. 2 shows the operation of a speed limiting system 22 in which a combustion engine driven vehicle can be completely shut down because the rate of travel signal in line 48 has exceeded an overspeed limit value for a preselected time period. FIG. 2 is illustrative, however, and the invention does not require that a vehicle be powered by combustion engine, or that if it is, that the speed limiter 30 operate to completely shut down the combustion engine. For instance, instead of limiting electrical power to an ignition coil 40, the speed limiter 30 can limit engine power by limiting engine fuel intake through electrical control of a carburetor or fuel injector. Alternatively, the speed limiter 30 can scramble the power transmitted in line 42A to ignition coil 40 and cause the engine to run rough until the operator slowed down sufficiently below the preset overspeed limit value. Also, the system in FIG. 2 can be used on a vehicle powered by an electric motor by using the system 22 to limit or totally interrupt electrical power to the electric motor.

FIG. 2 also shows a warning indicator 52, such as a warning light or warning buzzer. The warning indicator 52 receives a positive voltage from the speed limiter 30 via line 36B and a negative voltage via lines 26 and 54. Under normal operation, the speed limiter 30 does not provide positive battery voltage in line 36B to the warning indicator 52, so the warning indicator 52 is normally off. However, when the rate of travel signal in line 48 from the sensor 46 exceeds a warning limit value, preferably 90% of the overspeed limit value, the speed limiter 30 provides an electrical connection between line 36A and 36B, and positive electrical voltage is provided to the warning indicator 52.

Figure 3:
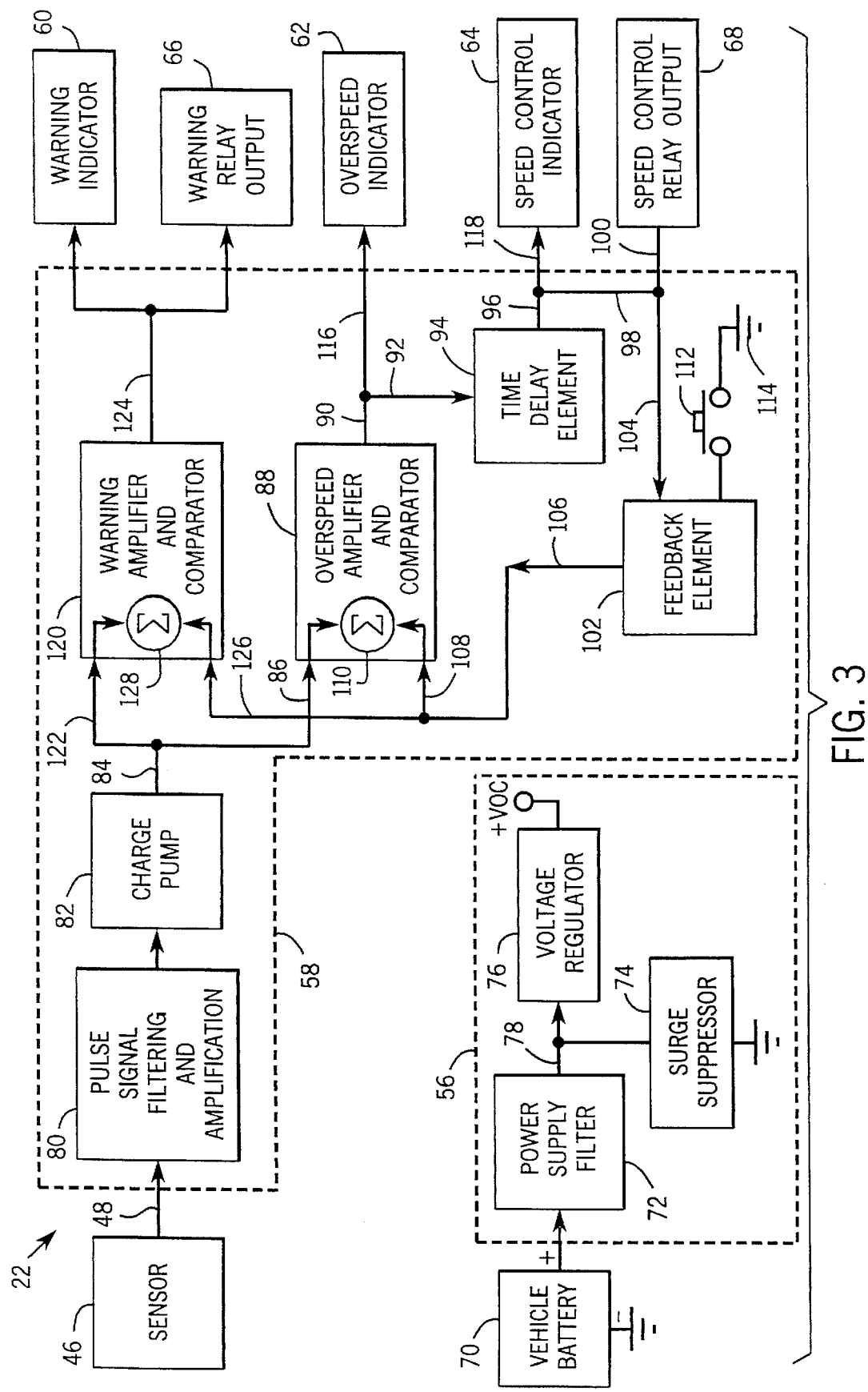
FIG. 3 is a block diagram showing preferred electrical connections of a power supply and a speed limiting controller in accordance with the invention.

FIG. 3 shows a speed limiting system 22 in more detail than FIG. 2. In FIG. 3, the speed limiting system 22 has a sensor 46, a regulated power supply 56, a speed limiting controller 58 and controller output indicators 60, 62 and 64, and output relays 66 and 68.

The regulated power supply 56 supplies high-quality direct current, voltage to the speed limiting controller 58 at 7.5 volts DC. The regulated power supply receives positive voltage from a vehicle battery 70, typically 12 volts. The voltage regulator 56 is useful because power from the vehicle 70 can vary with engine or motor speed, and spikes and dips in the electrical power can be introduced from the vehicle ignition and lighting systems. Also, outside influences from the industrial environment can affect the stability of power from the vehicle battery 70. Power from the vehicle battery 70 is filtered through a power supply filter 72, and then transmitted through line 78 to a voltage regulator 76 which converts the power to 7.5 volts DC. A surge suppressor 74 can be connected to line 78.

Figure 6:
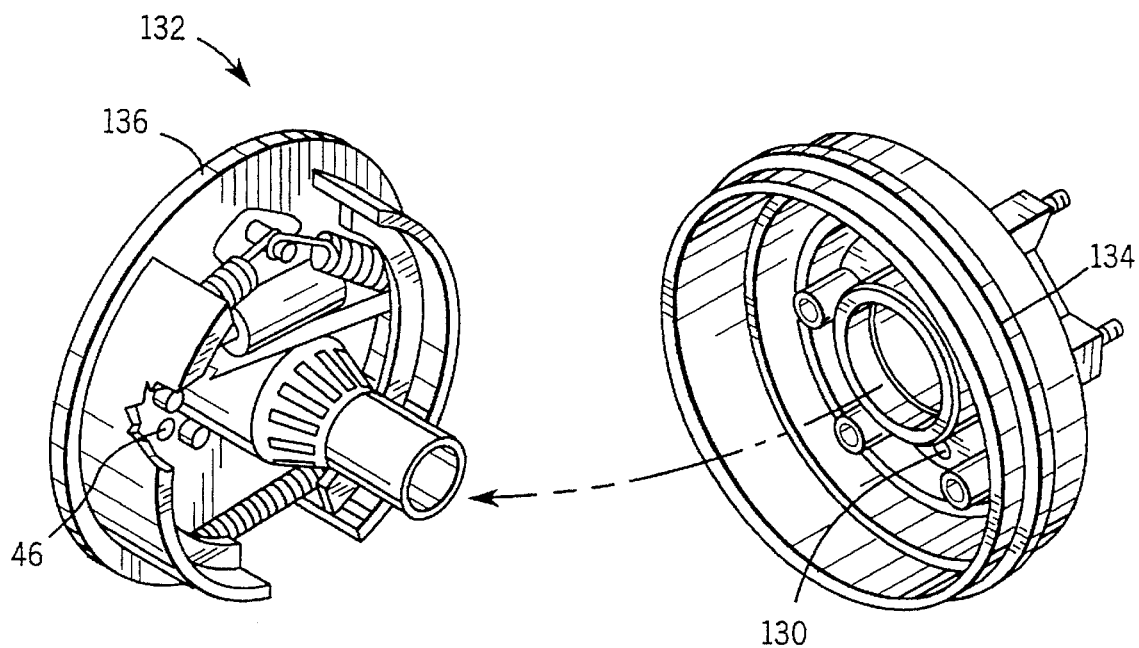
FIG. 6 is an exploded perspective view showing a rotation sensor pick-up and trigger magnet mounted in accordance with the invention.

The sensor 46 which outputs the rate of travel signal in line 48 can be any type of sensor capable of measuring the travel speed of the vehicle 10. The preferred sensor 46 is a rotation sensor pick-up, such as a read switch, that measures the rotation of one or more trigger magnets mounted to a rotating component in the vehicle drive train. FIG. 6 shows the preferred mounting configuration for trigger magnets 130 and a rotation sensor pick-up 46 within a brake drum 132 of a vehicle 10 incorporating the speed limiting system 22. It is preferred that the trigger magnets 130 be mounted on a portion 134 of the brake drum that rotates with the vehicle axle. It is preferred that the rotation sensor 46 be located on a brake backing plate 136 which does not rotate with respect to the vehicle 10.

The invention contemplates that the sensor 46 and trigger magnets 130 can be mounted in other locations than those shown in FIG. 6. For instance, the trigger magnets 130 could be directly mounted to a vehicle axle, differential gearing, wheel, or some other rotating component along the vehicles drive train. The sensor 46 should be located within close proximity of the trigger magnets 130 so that the sensor 46 can properly sense movement of the trigger magnets 130 in operation.

It is possible that the rate of travel signal in line 48 from sensor 46 be subjected to extraneous electro-magnetic interference such as radio frequency signals, arc welding, induction furnaces, static discharge, motors or generators, etc. Therefore, it may be desirable to filter out unwanted noise from the rate of travel signal transmitted to the speed limiting controller 58 through line 48. It may also be desirable to amplify the filtered rate of travel signal. Filtering and amplification of the travel speed signal in line 48 are shown schematically by block 80.

The speed limiting controller 58 can be embodied in an analog circuit such as a modified quad operational amplifier integrated circuit from National Semiconductor, or can be embodied in either a programmable or non-programmable digital microprocessor. In an analog circuit, a charge pump 82 is used to convert the frequency of pulses from the sensor 46 into an analog voltage representing the rate of travel of the vehicle. The charge pump 82 should not be necessary in a digital system.

The rate of travel signal is transmitted through lines 84 and 86 to an overspeed amplifier and comparator 88. The overspeed amplifier and comparator preferably amplifies and/or scales the rate of travel signal from the charge pump 82, and compares the signal to a fixed overspeed limit value. Scaling allows the same circuit to be used with different sized tires or vehicle velocities. If the scaled rate of travel signal exceeds the overspeed limit value, the overspeed comparator turns on and a logic high overspeed signal (e.g. 7.5 volts DC) is output into line 90. If the scaled rate of travel signal falls below the overspeed limit value, the overspeed comparator 88 turns off and logic low overspeed signal (e.g. 0 volts DC) is present in line 90. The overspeed signal in line 90 is input to a time delay element 94 through line 92.

The time delay element 94 turns on and outputs a logic high (e.g. 7.5 volts DC) speed control signal in line 96 if the overspeed signal in line 92 continues to be logic high for the selected time delay period. In other words, the presence of a logic high overspeed signal in line 92 triggers the time delay element 94, and the time delay element 94 outputs a logic high speed control signal in line 96 if the overspeed signal in line 92 continues to be a logic high for the selected time delay period. If the time delay element 94 is triggered by the presence of a logic high overspeed signal in line 92, but the overspeed signal in line 92 becomes logic low before the end of the selected time delay period, the time delay element 94 does not turn on and does not output a logic high speed control signal in line 96.

If the controller 58 is an analog controller, the time delay element 94 would typically include a resistor/capacitor network or some other type of time delay integrated circuit. If the time delay element uses a resistor/capacitor system, the selected time delay period will normally be determined in relation to the amount of time it takes to charge a capacitor in the circuit. If the controller 58 is a digital microprocessor, the time delay element can use the microprocessor clock, or any other useful digital timing method.

A logic high speed control signal in line 96 is transmitted through lines 98 and 100 from the speed limiting controller 58 to a speed control relay or some other type of speed control mechanism as shown schematically by block 68. Referring briefly to FIG. 2, a speed control relay would typically be located electrically between lines 38A and 42A.

Referring again to FIG. 3, a logic high speed control signal is also transmitted from the time delay element 94 to a feedback element 102 through lines 96, 98 and 104. The feedback element 102 is not necessary for operation of the invention, but it may be preferred to use a feedback element 102 to provide a swamping signal to the overspeed amplifier and comparator 88. In the preferred system, the feedback element 102 outputs a swamping signal in lines 106 and 108 when the feedback element 102 inputs a logic high speed control signal from line 104. The swamping signal in line 108 is added to the rate of travel signal in line 86, as shown schematically by summer 110, before the rate of travel signal is compared to the overspeed limit value. In this manner, the overspeed amplifier and comparator 88 is swamped by the combined input through lines 86 and 108, and the overspeed amplifier and comparator 88 continues to output a logic high overspeed signal in line 90. Thus, once a logic high speed control signal is output through lines 96, 98 and 100 from the speed limiting controller 58, the swamping signal from the feedback element 102 will latch the system 22 in a mode continuously outputting a logic high speed control signal even if the rate of travel signal in line 86 falls below the overspeed limit value. A reset 112 is provided for the feedback element 102. When the reset 112 is closed, an electrical connection from the electrical input in line 104 of the feedback element 102 is completed to ground 114, and the feedback element 102 does not output a swamping signal in line 106 despite the presence of a logic high speed control signal in line 104.

A logic high overspeed signal (e.g. 7.5 volts DC) from the overspeed amplifier and comparator 88 can also be transmitted through lines 90 and 116 to an overspeed indicator 62 such as a light, buzzer, remote recorder. Likewise, a logic high speed control signal (e.g. 7.5 volts DC) from the time delay element 94 can be transmitted through lines 96 and 118 to a speed control indicator or recorder 64.

The speed limiting controller 58 also preferably has a warning amplifier and comparator 120 to provide a warning signal output when approaching an overspeed condition. The warning amplifier and comparator 120 operates similar to the overspeed amplifier and comparator 88 but at a lower set point. The warning amplifier and comparator 120 inputs the rate of travel signal via lines 84 and 122. The warning amplifier and comparator 120 amplifies and/or scales the rate of travel signal, compares the amplified and/or scales rate of travel signal to a warning limit value, and outputs a logic high warning signal in line 124 if the amplified and/or scaled rate of travel signal exceeds the warning limit value. The logic high warning signal (e.g. 7.5 volts DC) can then power a warning indicator 60 such as a light or buzzer. The logic high warning signal can also be transmitted to some other type of device such as a control device or a recorder as shown schematically by block 66.

In practice, it will usually be preferred that the warning limit value be about 90% of the overspeed limit value. This 10% cushion should provide ample time for a driver to decelerate in response to a warning indicator 60 without causing the generation of a logic high speed control signal in lines 96, 98, 100 and 104.

It may be desirable to have the swamping signal from the feedback element 102 also swamp the warning amplifier and comparator 120, through lines 106 and 126. The preferred warning amplifier and comparator 120 has a summer 128 for adding the swamping signal in 126 to the rate of travel signal in 122.

FIGS. 4A and 4B schematically depict an operator display 130 in accordance with the invention. The operator display 130 can be any reasonable size that facilitates mounting on the vehicle so that a passenger within the passenger compartment 12 can easily view the display 130. FIG. 4A shows a front face 132 of the operator display 130. The front face 132 of the operator display 130 preferably has a speed control indicator light 64, an overspeed indicator light 62, a warning indicator light 60A, and a warning buzzer 60B. The electrical connections of these indicators 60A, 60B, 62 and 64 are described schematically in FIG. 3 which bear similar reference numbers for these indicators. Referring to both FIGS. 4A and 4B, a mounting surface 134 is provided having mounting flanges 136 to facilitate mounting of the operator display 130 to the forklift 10.

FIG. 5 shows a control box 138 in which the power regulator 56 and the speed limiting controller 58 are packaged. The control box 138 preferably has a top 140 that has a key-operated lock 142 so that only a person with a key, such as a supervisor, can manipulate control adjustments within the box 138. While FIG. 5 shows a control box 138 having a user interface for an analog controller 58, the controller 58 can also be digital. A digital controller 58 preferably has a keyboard/display type of user interface.

In FIG. 5, a reset button 112 is normally located within the key-locked control box 138, although it may be desirable that the reset button 112 be accessible without unlocking the lock 142. Switch 144 can be used to switch the feedback element 102 between automatic and manual reset modes. In the manual mode, the reset button 112 must be pressed (i.e. closed) to reset the feedback element 102. In the automatic mode, the feedback element can be automatically reset when the speed control signal in line 104 becomes a logic low signal, thus eliminating the need to physically shut the reset button 112. An adjustment potentiometer 148 for the overspeed amplifier and comparator 88 is available for adjusting the overspeed limit value. An adjustment potentiometer 150 is available for adjusting the warning limit value in the warning amplifier and comparator 120. A test button 146 is provided for testing the system 22 prior to operation. There are many ways in which testing through test button 146 can be implemented. One such way is for the test button 146 to implement a swamping signal from the power regulator 56 to line 84 (see FIG. 3). A sensor indicator light 152 can also be provided to ensure that the sensor 46 is operational.

It is recognized that various equivalents, alternatives, and modifications are possible within the scope of the invention and should be considered to fall within the scope of the appended claims.

We claim:

1. In a powered vehicle using power for vehicle propulsion and for accomplishing non-propulsion work, a vehicle travel speed limiting system comprising:
   a speed sensor that generates a rate of travel signal representing the travel speed of a vehicle;
   a speed limiting controller having;
      an overspeed comparator that inputs the rate of travel signal and outputs an overspeed signal when the rate of travel signal exceeds an overspeed limit value, and
      a time delay element that inputs the overspeed signal and outputs a speed control signal if the overspeed signal continues to input the time delay element for a selected time period; and
      a speed control relay that inputs the speed control signal and controls vehicle power to limit vehicle travel speed only after the vehicle travel speed exceeds the overspeed limit value for the selected time period without restricting vehicle power for non-propulsion work before the vehicle travel speed has exceeded the overspeed limit value for the selected period of time.

2. A system as recited in claim 1 wherein the speed sensor is a rotation sensor that generates a rate of rotation signal proportional to a rotation rate of an axle on the vehicle, and the rate of travel signal is the rate of rotation signal.

3. A system as recited in claim 1 further comprising:
   a warning comparator that inputs the rate of travel signal and outputs a warning signal when the rate of travel signal exceeds a warning limit value, and
   a warning indicator that inputs the warning signal.

4. A system as recited in claim 1 further comprising a speed control indicator that inputs the speed control signal.

5. A system as recited in claim 1 further comprising an overspeed indicator that inputs the overspeed signal.

6. A system as recited in claim 1 further comprising a feedback element that inputs the speed control signal and outputs a swamping signal that inputs the overspeed comparator, and causes the overspeed comparator to output the overspeed signal even after the rate of travel signal no longer exceeds the overspeed limit value.

7. A system as recited in claim 6 further comprising a reset switch to manually reset the feedback element.

8. A system as recited in claim 6 wherein the speed limiting controller is a digital signal processor.

9. A system as recited in claim 2 wherein the rate of rotation signal from the rotation sensor is filtered, amplified and converted to an analog voltage signal before the rate of rotation signal inputs the overspeed comparator in the controller.

10. A system as recited in claim 2 wherein the system further comprises a trigger magnet that moves relative to the rotation sensor in proportion to the rotation rate of the axle of the vehicle.

11. A system as recited in claim 1 further comprising a recorder that inputs and records the speed control signal.

12. A system as recited in claim 1 further comprising a recorder that inputs and records the overspeed signal.

13. In a powered vehicle using power for vehicle propulsion and for accomplishing non-propulsion work, a vehicle travel speed limiting system comprising:
   means for generating a rate of travel signal representing a travel speed of a vehicle;
   means for amplifying the rate of travel signal;
   means for comparing the amplified rate of travel signal to an overspeed limit value;
   means for generating a speed control signal when the rate of travel signal exceeds the overspeed limit value for a selected time period; and
   means for controlling vehicle power to limit vehicle travel speed only after the vehicle travel speed exceeds the overspeed limit value for the selected time period without restricting vehicle power for non-propulsion work before the vehicle travel speed has exceeded the overspeed limit value for the selected period of time.

14. A system as recited in claim 13 wherein the means for comparing the rate of travel signal to an overspeed limit value and the means for generating a speed control signal are within one or more analog circuits.

15. A system as recited in claim 13 wherein the means for comparing the rate of travel speed to an overspeed limit value and the means for generating a speed control signal are within a digital processor.

16. A forklift truck comprising:
   a forklift load carriage;
   a forklift passenger compartment suspended on at least one wheel;

means for providing power to move the forklift load carriage and to propel the forklift;

a speed sensor that monitors a forklift passenger compartment travel speed and generates a rate of travel signal representing the travel speed of the forklift passenger compartment; and a speed limiter that inputs the rate of travel signal and outputs a speed control signal when the rate of travel signal exceeds an overspeed limit value for a selected time period, wherein the speed limiter controls forklift power to limit the travel speed of the forklift passenger compartment only after the travel speed exceeds the overspeed limit value for the selected time period without restricting power to move the forklift load carriage before the travel speed has exceeded the overspeed limit value for the selected period of time.

17. A forklift truck as recited in claim 16 further comprising:

a battery; and an electric motor that receives an amount of electrical power from the battery to propel the passenger compartment;

wherein the amount of electrical power to the electric motor is limited when the speed limiter outputs the speed control signal.

18. A forklift truck as recited in claim 16 further comprising:

a combustion engine that outputs power to propel the passenger compartment and to move the forklift carriage;

wherein the power output of the combustion engine is limited when the speed limiter outputs the speed control signal.

19. A forklift truck as recited in claim 18 further comprising:

a battery;

a contactor that receives and transmits electrical power from the battery when closed;

an ignition coil that receives electrical power from the contactor and transmits electrical power to a distributor of the combustion engine;

wherein the contactor opens in response to the speed control signal thereby interrupting electrical power to the distributor.

20. A forklift truck as recited in claim 18 wherein the power output of the combustion engine is limited in the presence of the speed control signal by limiting the fuel to the engine.

21. A forklift truck as in claim 16 further comprising a warning indicator that receives power from the speed limiter when the rate of travel signal exceeds a warning limit value.

22. A forklift truck as recited in claim 16 further comprising a recorder that receives and records the speed control signal from the speed limiter when the rate of travel signal exceeds the overspeed limit value for a selected time period.

23. A speed limiting system for a vehicle comprising:

a speed sensor that generates a rate of travel signal proportional to a travel speed of a vehicle; and a speed limiting controller having an overspeed comparator that inputs the rate of travel signal and outputs an overspeed signal when the rate of travel signal exceeds an overspeed limit value, a time delay element that inputs the overspeed signal and outputs a speed control signal if the overspeed signal continues to input the time delay element for a selected time period, a speed control relay that inputs the speed control signal, a warning comparator that inputs the rate of travel signal and outputs a warning signal when the rate of travel signal exceeds a warning limit value.

a warning indicator that inputs the warning signal, a feedback element that inputs the speed control signal and outputs a swamping signal that inputs the overspeed comparator and the warning comparator, and causes the overspeed comparator to output the overspeed signal and the warning comparator to output the warning signal even after the rate of travel signal no longer exceeds the overspeed limit value, and a reset switch to manually reset the feedback element.

* * * * *